(12) United States Patent
Hauske et al.

(10) Patent No.: US 8,718,481 B2
(45) Date of Patent: May 6, 2014

(54) METHOD AND DEVICE FOR PHASE RECOVERY AND COMMUNICATION SYSTEM COMPRISING SUCH DEVICE

(75) Inventors: Fabian Hauske, Wörthsee (DE); Maxim Kuschnerov, München (DE); Berthold Lankl, Egmating (DE); Kittipong Piyawanno, München (DE); Bernhard Spinnler, Oberhaching (DE)

(73) Assignee: Xieon Networks S.A.R.L., Luxembourg (LU)

( * ) Notice: Subject to any disclaimer, the term of this patent is extended or adjusted under 35 U.S.C. 154(b) by 522 days.

(21) Appl. No.: 12/937,479

(22) PCT Filed: Apr. 8, 2009

(86) PCT No.: PCT/EP2009/054203
§ 371 (c)(1),
(2), (4) Date: Oct. 12, 2010

(87) PCT Pub. No.: WO2009/124961
PCT Pub. Date: Oct. 15, 2009

(65) Prior Publication Data
US 2011/0033191 A1 Feb. 10, 2011

(30) Foreign Application Priority Data

Apr. 10, 2008 (EP) ..................................... 08007113

(51) Int. Cl.
*H04B 10/00* (2013.01)
*H04B 10/06* (2011.01)
*H04L 27/00* (2006.01)

(52) U.S. Cl.
USPC ........... 398/152; 398/154; 398/155; 398/202; 375/326

(58) Field of Classification Search
None
See application file for complete search history.

(56) References Cited

U.S. PATENT DOCUMENTS

| | | | | |
|---|---|---|---|---|
| 4,220,923 | A | 9/1980 | Pelchat et al. | |
| 4,466,108 | A * | 8/1984 | Rhodes | 375/329 |
| 5,388,088 | A * | 2/1995 | Gans et al. | 398/65 |
| 7,606,498 | B1 * | 10/2009 | Wu et al. | 398/152 |
| 7,688,918 | B2 * | 3/2010 | Koc | 375/329 |
| 8,189,718 | B2 * | 5/2012 | Li et al. | 375/324 |
| 8,374,512 | B2 * | 2/2013 | Tao et al. | 398/202 |
| 2007/0091996 | A1 * | 4/2007 | Yu et al. | 375/233 |
| 2010/0021179 | A1 * | 1/2010 | Kikuchi | 398/183 |
| 2010/0309970 | A1 * | 12/2010 | Meyer | 375/233 |
| 2012/0224184 | A1 * | 9/2012 | Li et al. | 356/491 |

OTHER PUBLICATIONS

Duvoisin P F et al: "Performance of the adaptive baseband diagonalizer, a crosstalk canceller, in dual-polarized 16-QAM systems" SOUTHEASTCON '88, IEEE Conference Proceedings, Apr. 11, 1988-Apr. 13, 1988 pp. 358-363, XP010075187 TN, USA.

(Continued)

*Primary Examiner* — Ken Vanderpuye
*Assistant Examiner* — Merlin Brito Peguero
(74) *Attorney, Agent, or Firm* — Laurence A. Greenberg; Werner H. Stemer; Ralph E. Locher

(57) ABSTRACT

A method and a device are provided for phase recovery of at least two channels comprising the steps of (i) a phase is estimated for each channel; (ii) the phase estimated of each channel is superimposed by a coupling factor with at least one other phase estimated. Further, a communication system is suggested comprising such a device.

14 Claims, 3 Drawing Sheets

(56) References Cited

OTHER PUBLICATIONS

Hsieh S T et al: "A Method for Improving the Performance of Cross Polarized PSK and QAM Systems in the Presence of Depolarization Crosstalk" International Conference on Communications, vol. 3, Jun. 23, 1985-Jun. 26, 1985 pp. 1264-1269, XP000795174 NY, US.

Cusani R et al: "A Novel Procedure for Jones' Parameters Estimation for M-4QAM Optical Systems" European Transactions on Telecommunications, vol. 8, No. 2, Mar. 1, 1997, pp. 191-199, XP000687114 Wiley & Sons, Chichester, GB ISSN: 1124-318X.

Dinc A et al: "Error probabilities of bootstrapped blind adaptive cross-pol cancellers for M-ary QAM signals over non-dispersive fading channel" Discovering a New World of Communications, Proceedings of the International Conference on Communications, vol. -, Jun. 14, 1992-Jun. 18, 1992 pp. 1593-1598, XP010061921 NY, US ISBN: 978-0-7803-0599-1.

Dinc A et al: "Performance comparison of LMS, diagonalizer and bootstrapped adaptive cross-pol cancellers for M-ary QAM" Military Communications Conference, 1990. MILCOM '90, Conference Record, A New Era, vol. 1, Sep. 30, 1990-Oct. 3, 1990 pp. 101-105, XP010002753 CA, USA.

Seimetz, Matthias: "Performance of coherent optical square-16-QAM-systems based on IQ-transmitters and homodyne receivers with digital phase estimation" Optical Fiber Communication Conference, 2006 and the 2006 National Fiber Optic Engineers Conference. OFC 2006, Mar. 5, 2006-Mar. 10, 2006 XP002505529.

\* cited by examiner

METHOD AND DEVICE FOR PHASE RECOVERY AND COMMUNICATION SYSTEM COMPRISING SUCH DEVICE

BACKGROUND OF THE INVENTION

Field of the Invention

The invention relates to a method and to a device for phase recovery and to a communication system comprising such a device.

In order to increase the bandwidth efficiency and robustness against distortions, optical communication systems require modulation formats of higher order like, e.g., 100 Gbit/s coherently demodulated polarization multiplex of quaternary phase-shift keying (CP-QPSK). Hence, both polarizations (e.g., x-polarization and y-polarization) of PolMUX and the constellations of the complex signal (QPSK) are utilized for conveying data (e.g., as symbols).

With the modulation format increasing, the symbol rate in the optical system is reduced. For example, in the case of 100 Gbit/s CP-QPSK with 4 bits per symbol, the symbol rate amounts to 100/4=25GSymbols/s. This makes the transmission more robust against optical distortions like chromatic dispersion (CD) or polarization mode dispersion (PMD). Such reduction of the symbol rate also allows for less processing power at the receiver.

A typical arrangement for a coherent demodulation of optical communication signals is shown in FIG. 1. After an optical "90°-hybrid" block 101 and an analog/digital conversion (ADC) unit 102, a sampled and quantized representation of the optical field as an electrical signal is available that contains statistic noisy distortions as well as deterministic channel distortions.

A clock recovery 103 estimates start and end of the symbols of the incoming signal. An adaptive equalization unit 104 estimates the channel and removes deterministic channel distortions.

For signal transmission purposes, the phase and amplitude of the complex signal can be used to transmit information. In the case of QPSK, 2 bits are mapped to the four possible phase constellations.

At the receiver, this phase may be affected by a freely running local oscillator (LO) that is used to mix down the signal. The phase may also be affected by the channel by means of non-linear effects that increase with power and number of adjacent channels (Cross-Phase Modulation, XPM).

A phase recovery entity 105 needs to estimate and to correct the phase offset of the received signal. A phase error caused by the local oscillator changes rather slowly with regard to the symbol rate, whereas a phase error based on interference of adjacent channels (XPM) may change from one symbol to another as they directly depend on the power of adjacent channel bits at the same time.

In presence of adjacent channels, the phases of the signal in the x- and y-polarizations are not identical anymore due to non-linear phase distortions and simple joint estimation of the both phases can result in significant penalties.

For economy reasons, signal processing comprising in particular clock recovery, equalization, phase estimation and detection, is preferably digitally implemented, which implies that after the ADC 102 only digital data is processed. Due to the high processing speed required (which is based on the symbol rate of the optical data received) and due to the significant processing complexity, existing hardware may be a bottleneck regarding processing speed and/or cost.

BRIEF SUMMARY OF THE INVENTION

The problem to be solved is to overcome the disadvantages stated above and in particular to provide a solution that allows an improved phase recovery.

This problem is solved according to the features of the independent claims. Further embodiments result from the depending claims.

In order to overcome this problem, a method for phase recovery of at least two channels is provided comprising the steps:

a phase is estimated for each channel;

the phase estimated of each channel is superimposed by a coupling factor with at least one other phase estimated.

In particular, the step of estimating the phase for each channel comprises a pre-correction stage of the phase without firstly considering any other channel. Then, the pre-corrected signals utilize a coupling factor to superimpose one channel with at least one other channel. This enables phase recovery by efficiently taking into account adjacent channels thereby widely avoiding false phase estimations.

In an embodiment, the at least two channels are at least two orthogonal channels. The at least two channels may in particular be optical channels.

In another embodiment, each channel is modulated according to one of the following modulation schemes:

all kinds of PSK schemes, in particular QPSK, BPSK, 8PSK;

QAM, in particular high order QAM.

Such modulation schemes each define constellations (symbols) in a complex plane (I/Q-plane), wherein each constellation has a phase that needs to be determined in order to correctly assess a received symbol.

In a further embodiment, the coupling factor differs for at least two phases determined.

Hence, different coupling factors may apply, e.g. a coupling factor for each channel (and hence each phase estimated).

In a next embodiment, the coupling factors may be identical for at least two channels (e.g., phases to be estimated).

It is also an embodiment that the approach is utilized for determining a frequency offset of a local oscillator at a receiver.

Pursuant to another embodiment, the coupling factor comprises at least one fixed value.

According to an embodiment, the coupling factor is adaptively adjusted.

According to another embodiment, the coupling factor is determined based on a length of a fiber and/or an input power.

The problem stated above is also solved by a device comprising a and/or being associated with a processor unit and/or a hard-wired circuit and/or a logic device that is arranged such that the method as described herein is executable thereon.

According to an embodiment, the device is a or is associated with a communication device, in particular an optical network component.

The problem stated supra is further solved by a communication system comprising the device as described herein.

DESCRIPTION OF THE INVENTION

The approach provided herewith allows significant improvement of phase estimation in presence of interference from adjacent channels (e.g., in case of cross-phase modulation, XPM).

Hence, joint phase estimation of orthogonal input channels or signals (e.g., both x- and y-polarizations of an input signal) is achieved by polarization-independent pre-correction of the respective phases and by applying a variable coupling factor depending, e.g., on a fiber length and/or an input power that either can be adjusted adaptively or it may be constant, e.g., for known fiber links.

For QPSK, the phase estimation can be based on a "Viterbi-and-Viterbi phase estimation" as described in [1], which computes a phase deviation of the transmitted symbol to the most probable symbol sent and corrects the received symbol subsequently.

Applicable modulation schemes are, e.g., all PSK schemes in general (BPSK, QPSK, 8PSK) and higher order formats like QAM, where the inherent phase estimation algorithm is preferably adapted to the modulation scheme.

Advantageously, the coupled phase estimation with pre-correction of the phases may be independent from the phase estimation for each polarization (such polarizations can also be referred to as orthogonal input channels or signals).

Particular properties and/or advantages of the approach provided may in particular be as follows:

a. The coupling factor does not have to be identical for the orthogonal input signals, e.g., both polarizations.
b. A pre-correction does not have to be performed for low nonlinear channel crosstalk.
c. Pre-correction may not only affect the phase, but it may also have an effect on the amplitude.
d. The approach provided can be used for an estimation of the frequency offset of the local oscillator, which is usually estimated and subtracted from the symbol before the remaining phase of the signal is estimated.
e. The improvement of performance achieved by the suggested concept may result in an extended transmission reach, lower costs and more dynamic system design. This may in particular lead to an optical network capable of interworking with arbitrary legacy adjacent channels.

Figure 1:
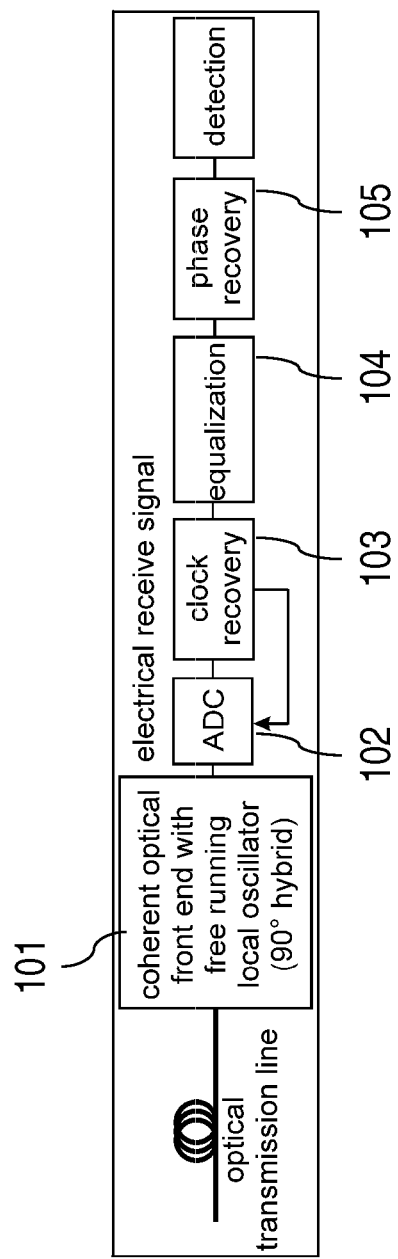
FIG. 1 shows a typical arrangement for a coherent demodulation of optical communication signals.
Figure 2:
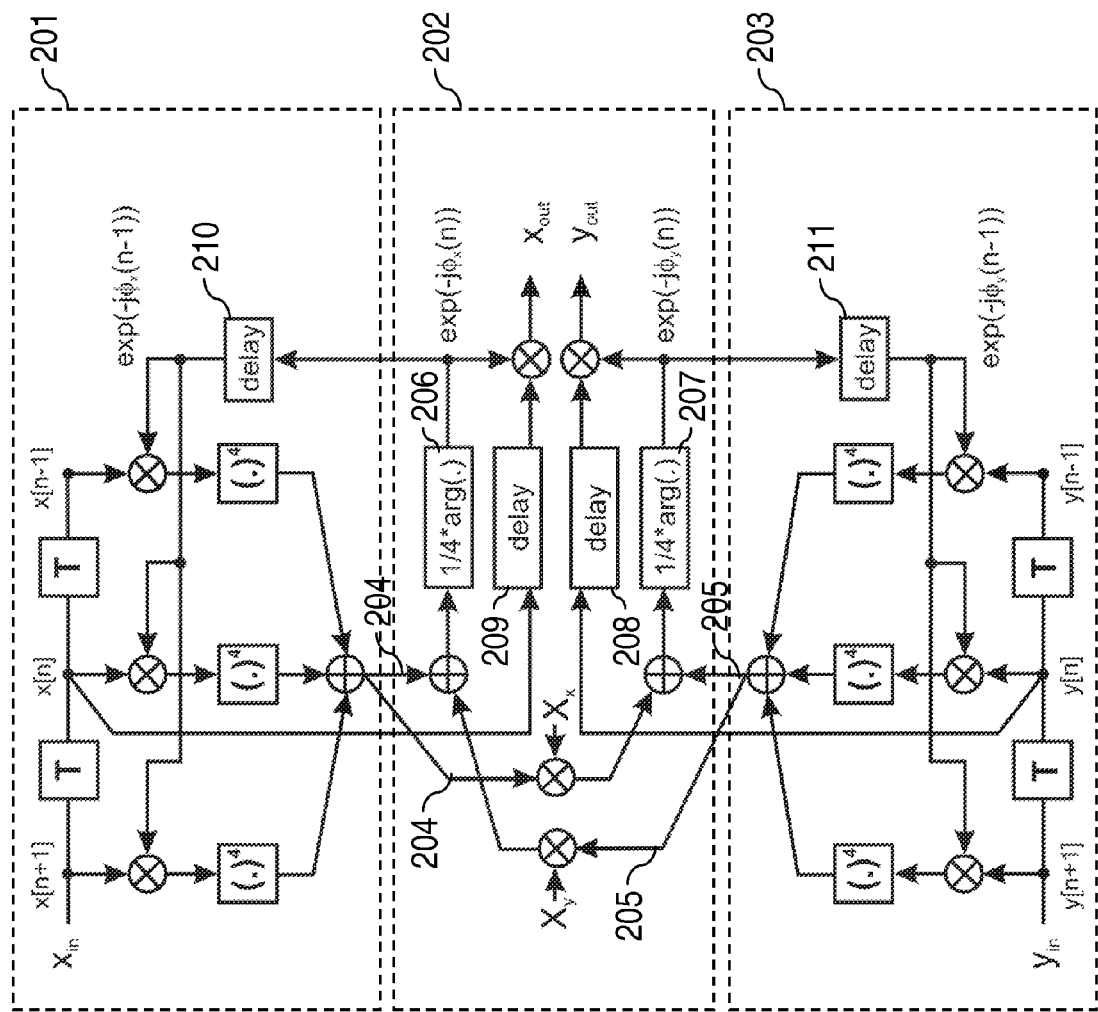
FIG. 2 shows a joint polarization phase estimation with pre-correction (over three symbols)

FIG. 2 shows an example of a joint polarization phase estimation, wherein a phase is estimated over 3 symbols.

A block 201 depicts a phase estimation for a polarization of a x-polarization and a block 203 depicts a phase estimation for a y-polarization. Both polarizations are in particular orthogonal to one another. However, based on the different phase-shifts mentioned, each polarization may affect the other polarization to a certain extent. According, for phase recovery purposes, the respective other polarization is considered.

Both blocks 201 and 203 in particular comprise a pre-correction stage for each signal.

A block 202 shows a joint processing superimposing the phase offsets of the respective other polarization with a pre-determined coupling factor X smaller or equal to 1. Regarding block 201, symbols $x_{in}$ are input to a shift register comprising three taps x[n+1], x[n] and x[n−1]. The shift register comprises two delay units T. Each tap is multiplied with a value $$p_0=\exp(-j\phi_x(n-1))$$

and thereinafter processed by a $(.)^4$ operator. Next, all outputs of the $(.)^4$ operators are added to a signal 204 and are fed to block 202.

For MPSK modulation, a Viterbi-Viterbi Mth-power phase offset estimation according to [1] can be used to remove symbol phase information from the complex symbol, leaving a complex vector with a phase that is identical to M times the phase offset to the closest undistorted symbol. In case of quaternary phase modulation with four different phases, M equals 4 and the operator becomes $(.)^4$. In order to determine the phase offset, the argument of the complex vector is taken and divided by M (1/M*arg).

The same applies in a similar way to block 203 for symbols $y_{in}$, wherein the shift register comprises three taps y[n+1], y[n] and y[n−1], wherein each tap is multiplied with a value $$q_0=\exp(-j\phi_y(n-1))$$

and thereinafter processed by the $(.)^4$ operator. Next, all outputs of the $(.)^4$ operators are added to a signal 205 and are fed to block 202.

In block 202, the signal 204 is combined with the signal 205 that has been multiplied with a coupling factor $X_y$. The result of this combination is fed to a processing unit 206. Further, the signal 205 is combined with the signal 204 that has been multiplied with a coupling factor X. The result of this combination is fed to a processing unit 207.

The tapped signal x[n] is fed to a delay unit 209 and the tapped signal y[n] is fed to a delay unit 208.

The value $p_0$ results from the output of the processing unit 206, which is delayed for a predetermined period of time by a delay unit 210. Accordingly, the value $q_0$ results from the output of the processing unit 207, which is delayed for a predetermined period of time by a delay unit 211.

The delay in the delay units 208 and 209 preferably equals the processing time of the phase feedback pre-correction, the 4th power operator and the two addition operations preceding the correction of the input symbol by the computed phase offset.

The output of the delay unit 209 is multiplied with the output of the processing unit 206 resulting in an output polarization $x_{out}$. The output of the delay unit 208 is multiplied with the output of the processing unit 207 resulting in an output polarization $y_{out}$.

In this example shown in FIG. 2, the coupling factor is different for each polarization. It may preferably amount, however, to a value less than or equal to 1.

For a phase estimation of a single symbol, one pre-cursor and one post-cursor are used as an example. This number is variable and it can be manually or adaptively adjusted for a fiber link.

Input symbols are corrected by the phase offset of the last computed signal for each polarization. After pre-correction, the symbol information is removed by the $(.)^4$ operator and averaged to provide a better estimate and to cancel noise.

The estimation is then improved by superimposing the phase offset vector of the other polarization by a certain coupling factor X, i.e. a coupling factor $X_y$ for the signal x and a coupling factor $X_x$ for the signal y.

A phase $\phi(n)$ is computed for both polarizations and it is used to correct the phase offset and it is used for pre-correcting a subsequent symbol.

After removal of the frequency offset, the phase drift of the local oscillator (LO) and primarily the XPM-induced phase changes are corrected in a second step. The effect of XPM depends on the polarization as is shown in the coupled nonlinear Schrödinger equation for the x polarization for the propagation of channel '1' with a neighbor channel '2':

$$\frac{\delta A_{x1}}{\delta z} + \frac{1}{v_{gx1}}\frac{\delta A_{x1}}{\delta t} + \frac{i\beta_{21}}{2}\frac{\delta^2 A_{x1}}{\delta t^2} + \frac{\alpha_1}{2}A_{x1} = i\gamma_1(|A_{x1}|^2 + 2|A_{x2}|^2 + B|A_{y1}|^2 + B|A_{y2}|^2)A_{x1},$$

with B=⅔ for a linearly birefringent fiber.

The nonlinear cross-channel phase shift depends on the polarization of the neighbor channels and may not be identical for the x and y polarizations. Based on the partial coupling of the XPM nonlinear phase shift, in a first step, a weighted approach for joint polarization phase estimation with the coupling factor X and averaging over N symbols is proposed by $$\phi_x = \frac{1}{4}\arg\left\{\sum_{k=-(N-1)/2}^{(N-1)/2}(x_k(\epsilon)^4 + X \cdot y_k(\epsilon)^4)\right\}$$

$$\phi_y = \frac{1}{4}\arg\left\{\sum_{k=-(N-1)/2}^{(N-1)/2}(X \cdot x_k(\epsilon)^4 + y_k(\epsilon)^4)\right\}$$

If coupling is used in feed-forward (FF) estimation, performance can be improved for low non-linearities due to high correlation of the phases, whereas for XPM-limited cases, FF phase estimation with coupling can lead to a deterioration of the performance, without any gain compared to the non-coupled case. In a second step, the performance can be further improved by pre-correcting the symbols with a feedback (FB) signal of the preceding phase-offset, increasing the correlation between the two polarizations.

Channel performance will be evaluated for phase estimation with one pre- and post-cursor in each polarization, which results in an advantageous overall performance.

Figure 3:
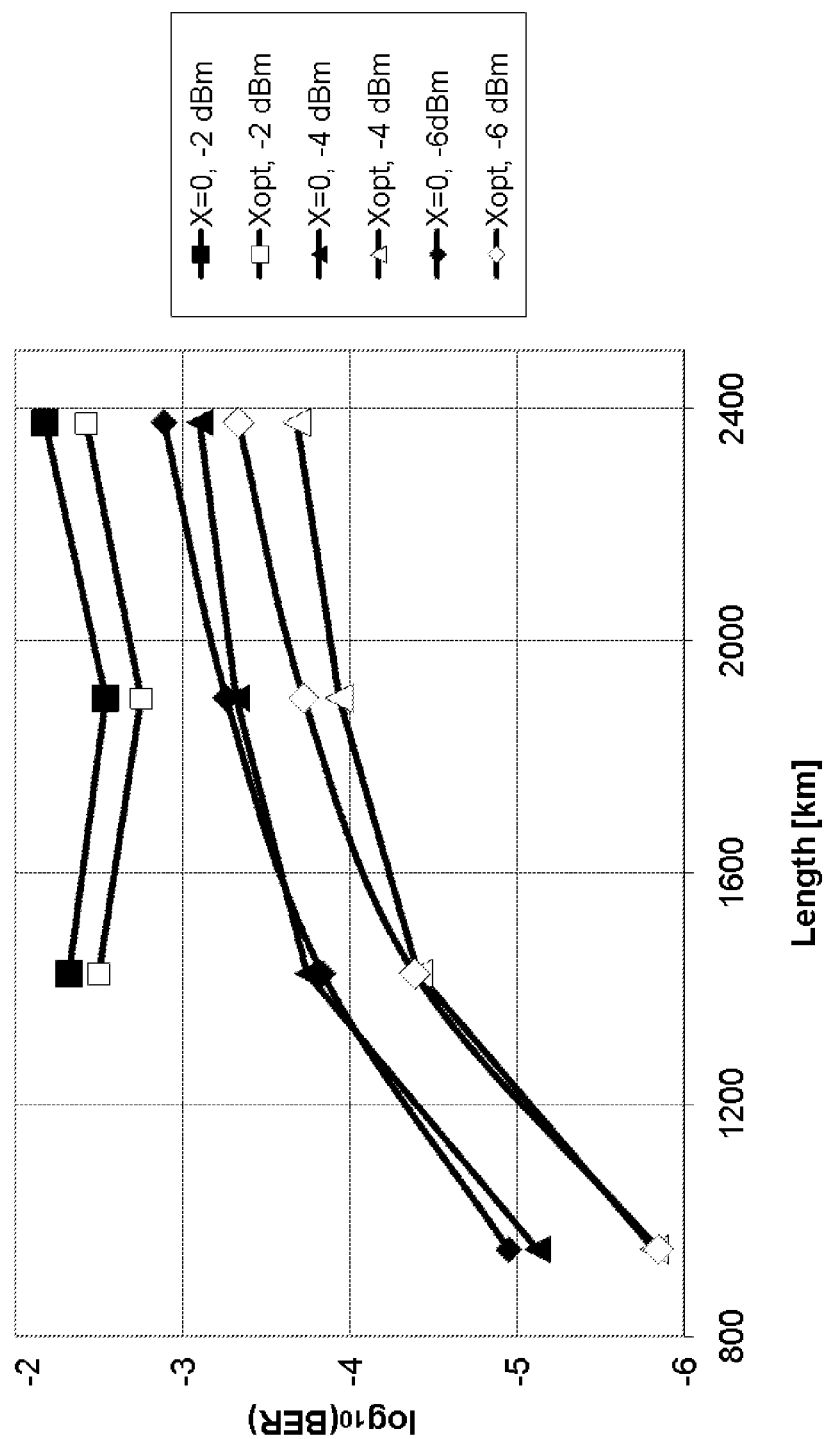
FIG. 3 shows a performance gain (bit error rate) of the approach suggested in view of a fiber length.

FIG. 3 shows the bit error rate (BER) versus the transmission distance for varying input power, comparing polarization-independent phase estimation (X=0) with the minimum BER for an optimal X∈[0; 1] evaluated for each set of measured data. The performance improvement is significant up to −4 dBm and begins to saturate above −3 dBm when the phases get increasingly uncorrelated.

Advantageously, the concept suggested (indicated by the graphs with "$X_{opt}$") allows an improved performance gain and thus a higher reach or less power for the same reach than conventional systems.

REFERENCE(S)

[1] A. J. Viterbi and A. M. Viterbi, "Nonlinear Estimation of PSK-Modulated Carrier Phase with Application to Burst Digital Transmission", IEEE Trans. Inf., IT-29, pp. 543-551, July 1983.

ABBREVIATIONS

8PSK 8 Phase Shift Keying
ADC Analog-to-Digital Converter
ASIC Application Specific Integrated Circuit
BER Bit Error Rate
BPSK Binary Phase Shift Keying
CD Chromatic Dispersion
CP Coherently Demodulated Polarization Multiplexed
FPGA Field Programmable Gate Array
PMD Polarization Mode Dispersion
PolMUX Polarization Multiplex
QAM Quadrature Amplitude Modulation
QPSK Quaternary Phase-Shift Keying
XPM Cross Phase Modulation

The invention claimed is:

1. A method for phase recovery of an optical signal, comprising the steps of:
    separating, with a coherent receiver device, the optical signal into an X component and a Y component having an orthogonal polarization to the X component;
    estimating a phase independently for the X component and the Y component; and
    superimposing the phase estimated for each of the X component and Y component multiplied by a coupling factor with the phase estimated for the other of the Y component and the X component.

2. The method according to claim 1, which comprises modulating each of the X component and Y component according to a PSK modulation or a QAM modulation.

3. The method according to claim 2, which comprises modulating with a PSK modulation scheme selected from the group consisting of QPSK, BPSK, and 8PSK.

4. The method according to claim 2, which comprises modulating with high order QAM.

5. The method according to claim 1, wherein the coupling factor differs for at least two phases.

6. The method according to claim 1, which comprises using one coupling factor for at least two phases.

7. The method according to claim 1, implemented for determining a frequency offset of a local oscillator at the receiver.

8. The method according to claim 1, wherein the coupling factor comprises at least one fixed value.

9. The method according to claim 1, which comprises adaptively adjusting the coupling factor.

10. The method according to claim 1, wherein the coupling factor is determined based on at least one of a length of a fiber or an input power.

11. A device for phase recovery of an optical signal, the device one of comprising and associated with:
    at least one of a processor unit, a hard-wired circuit, or a logic device configured to:
    separate the optical signal into an X component and a Y component having an orthogonal polarization to the X component;
    estimate a phase independently for the X component and the Y component; and
    superimpose the phase estimated for each of the X component and Y component multiplied by a coupling factor with the phase estimated for the other of the Y component and the X component.

12. The device according to claim 11, wherein the device is a communication device.

13. The device according to claim 12, wherein the device is an optical network component.

14. A communication system, comprising the device according to claim 11.

* * * * *